United States Patent [19]

Graham et al.

[11] Patent Number: 4,732,920
[45] Date of Patent: * Mar. 22, 1988

[54] HIGH STRENGTH PARTICULATES

[76] Inventors: John W. Graham, Rte. 5, Box 289, Alvin, Tex. 77511; A. Richard Sinclair, 2903 Virginia, Houston, Tex. 77098

[*] Notice: The portion of the term of this patent subsequent to Jul. 1, 2003 has been disclaimed.

[21] Appl. No.: 854,943

[22] Filed: Apr. 23, 1986

Related U.S. Application Data

[60] Continuation of Ser. No. 705,712, Feb. 26, 1985, Pat. No. 4,597,991, which is a division of Ser. No. 437,431, Oct. 27, 1982, Pat. No. 4,518,039, which is a continuation-in-part of Ser. No. 294,813, Aug. 20, 1981, abandoned.

[51] Int. Cl.[4] ............................ C08K 11/22; B22C 3/36
[52] U.S. Cl. ..................................... 523/145; 523/139; 523/144; 523/146; 523/147
[58] Field of Search ................ 427/214; 523/139, 144, 523/145, 146, 147

[56] References Cited

U.S. PATENT DOCUMENTS

| | | | |
|---|---|---|---|
| 3,234,159 | 2/1966 | Cooper | 523/145 |
| 3,878,159 | 4/1975 | Vargiu et al. | 523/145 |
| 3,969,547 | 7/1976 | Isawa et al. | 427/214 |
| 4,090,995 | 5/1978 | Smillie | 523/146 |
| 4,469,517 | 9/1984 | Cooke | 427/214 |

*Primary Examiner*—Lewis T. Jacobs
*Attorney, Agent, or Firm*—Arnold, White & Durkee

[57] ABSTRACT

An improved particulate material for use in treating subterranean formations as a proppant and/or as a fluid loss agent in hydraulic fracturing and as a screening material in gravel packing comprised of heat curable particles capable of forming a cohesive mass, said particles comprised of a high strength center, a coupling agent chemically bound to the center with a heat curable resin coated over the center.

18 Claims, No Drawings

HIGH STRENGTH PARTICULATES

BACKGROUND OF THE INVENTION

This is a continuation application of Ser. No. 705,712, filed Feb. 26, 1985, now U.S. Pat. No. 4,597,991 which, in turn, is a divisional application of Ser. No. 437,431, filed Oct. 27, 1982, now U.S. Pat. No. 4,518,039, which, in turn, is a continuation-in-part of Ser. No. 294,813, filed Aug. 20, 1981, now abandoned.

The present invention relates to an improved method for producing heat curable particles. The improved particulate material of this invention has utility, including but not limited to, use as a proppant in hydraulic fracturing, use as a fluid loss agent in hydraulic fracturing and as a screening material in gravel packing. The invention also relates to a method for producing improved particulate material for use in the production of shell molds and shell cores in the foundry industry.

In the completion and operation of oil wells, gas wells, water wells, and similar boreholes, it frequently is desirable to alter the producing characteristic of the formation by treating the well. Many such treatments involve the use of particulate material. For example, in hydraulic fracturing, particles (propping agents) are used to maintain the fracture in a propped condition. Smaller size particles (70 to 140 mesh) are used to control fluid loss during fracturing. Also in sand control techniques, particulate matter is placed in the well to prevent the influx or encroachment of formation sand or particles.

Although particulate material is used in the treatment of formations for a variety of reasons, there is one problem common among such treatments, the problem of particle stability. This problem can best be appreciated when considered in connection with specific treating techniques.

In hydraulic fracturing, propping agent particles under high closure stress tend to fragment and disintegrate. At closure stresses above about 5,000 p.s.i., silica sand, the most common proppant, is not normally employed due to its propensity to disintegrate. The resulting fines from this disintegration migrate and plug the interstitial flow passages in the propped interval. These migratory fines drastically reduce the permeability of the propped fracture.

Other propping agents have been used to increase well productivity. Organic materials, such as the shells of walnuts, coconuts and pecans have been used with some success. These organic materials are deformed rather than crushed when the fracture closes under the overburden load. Aluminum propping agents are another type which deform rather than disintegrate under loading. While propping agents such as these avoid the problem of creating fines, they suffer the infirmity of allowing the propped fracture width to close as the proppant is squeezed flatter and flatter with time. In addition, as these particles are squeezed flatter and flatter, the spaces between the particles grow smaller. This combination of decreased fracture width and decreased space between the particles results in reduced flow capacity.

An improved proppant over the materials mentioned above is spherical pellets of high strength glass. These high strength glass proppants are vitreous, rigid, and have a high compressive strength which allows them to withstand overburden pressures of moderate magnitude. In addition, their uniform spherical shape aids in placing the particles and provides maximum flow through the fracture. While these beads have high strength when employed in monolayers, they are less satisfactory in multilayer packs. In brine at 250° F., the high strength glass beads have a tendency to disintegrate at stress levels between 5000 and 6000 p.s.i. with a resultant permeability which is no better, if not worse, than sand under comparable conditions.

Resin coated particles have been used in efforts to improve the stability of proppants at high closure stresses. Sand or other substrates have been coated with an infusible resin such as an epoxy or phenolic resin. These materials are superior to sand at intermediate stress levels. However, at high termperature and high stress levels, the resin coated particles still show a decrease in permeability to about the same degree as silica sand.

In gravel pack completions, particularly sized aggregate is placed in the well adjacent to the formation to form a filter bed through which produced fluids must flow. In one type of gravel packed completion, e.g. a linerless gravel pack, the aggregate material is injected through the well casing perforations to provide a filter outside the casing for each perforation. This type of completion frequently fails because of the inability of the aggregate to bridge across the perforation, resulting in aggregate and formation sand entering the well bore.

Another type of gravel packed completion frequently used for sand control purposes is the liner gravel pack. This type of completion employs a well liner or screen packed in aggregate. Because, of settling or migration of the aggregate it is frequently difficult to maintain the gravel in surrounding relation to the liner. Also, failure of the liner caused by corrosion or collapse results in the loss of the filter bed surrounding the liner, at least in the vicinity of the liner failure.

Obviously, a desirable characteristic of well completions involving the use of particulate material is one of particle stability. Efforts to provide such stability, particularly in gravel packed completions, include the use of organic resins or resinous materials.

U.S. Pat. No. 3,857,444 to Copeland discloses a method for forming a permeably consolidated gravel pack in a well bore. The slurry containing a particulate material coated with an uncured epoxy resin and a curing agent in a solvent is slurried in liquid hydrocarbon and introduced into place in the formation. The well is shut in until the resin coated particulate mass cures to form a permeable consolidated sand or gravel pack.

U.S. Pat. No. 3,929,191 to Graham et al discloses a method for producing coated particles for use in treating subterranean formations. The particles in this method are coated with a resin dissolved in a solvent which is then evaporated. This patent also discloses that the coating may be produced by mixing the particles with a melted resin and subsequently cooling the mixture, forming a coating of resin on the particles.

The Graham patent also discloses that the addition of coupling agents to the system improves the bonding of the resin to the particles. This improved bonding strength between the resin and particles increases the strength of the mass formed when the resin coated particles are fused and cured into a porous mass. This increased strength is important due to the high stresses the material may be subjected to in use, such as when used as a proppant in hydraulic fracturing.

SUMMARY OF THE INVENTION

The present invention provides an improved method for producing heat curable resin coated particles comprised of high strength centers, a coupling agent chemically bound to the centers and a heat curable resin coated over the centers. The final product is a composite material consisting of high strength centers encapsulated with a coating of a heat curable solid resin. The material is free flowing and requires no special handling or storage conditions. The particles when cured have even greater compressive and tensile strength than those known in the prior art. The material produced by the invention is thus more useful than the materials of the prior art when used in high stress environments. For example, the method of the present invention may be used in hydraulic fracturing in situations where the material of the prior art would fail under the high closure stress of the formation. The method also yields superior gravel packs to that obtainable with the prior art. In addition, the improved bonding of the resin to the centers yields a cured material with increased tensile strength. This allows shell molds and cores in the foundry industry to be made from material with a higher particle to resin ratio than heretofore possible.

These improved curable resin coated particles are produced by first coating the centers with a coupling agent. The treated centers are then heated to drive off any solvent employed with the coupling agent and to react the coupling agent with the centers. This heating also serves to raise the temperature of the centers above the melting point of the resin. The solid resin, into which a coupling agent was incorporated during its manufacture, is then added in either flake or powdered form to the heated centers. The centers and resin are mixed until the resin forms an even coating on the surface of the centers. The mixture is then quenched with water which serves to harden the coating on the centers and to prevent further reaction of the resin.

Improved results have also been obtained using a coupling agent only in the resin. It is also possible to obtain beneficial results by using only the pretreatment of the centers. However, coating the center with a coupling agent as described above and incorporating a coupling agent in the resin has produced the best results and accordingly is the preferred method.

DESCRIPTION OF THE INVENTION

Particle Substrate

The present invention can be carried out with any suitable high strength substrate as the particle centers. Choice of the particle substrate is governed by the properties required of the cured mass.

For example, in the oil and gas industry extremely high strength proppants are needed to hold open formation fractures created by hydraulic fracturing. In such an application, the present invention may use spherical glass beads as the center. Such beads are available commercially in a variety of mesh sizes. For example, Union Carbide Corporation supplies vitreous, rigid, inert, substantially spherical pellets under the trade name UCAR Props. Such beads, while of extremely high compressive strength when employed in monolayers are less satisfactory when placed in multilayer packs. These beads, when resin coated by the process of this invention and then cured in place, yield a permeable mass of higher compressive strength than either the beads alone or of resin coated beads of the prior art. Beads from about 6 to about 200 mesh are generally used. In extreme environments where stresses are very high sintered bauxite, aluminum oxide and ceramics such as zirconium oxide and other mineral particles may be coated. Particles from 6 to 200 mesh are generally used. (All reference to mesh size in the claims and specification are to the U.S. Standard Sieve Series.)

In less severe conditions conventional frac sand is the preferred particle substrate of the invention. An advantage of the present invention is that due to the increased strength obtained by the coating process, it allows the lower cost frac sand to be used under more severe conditions than possible with the materials of the prior art. Silica sand of about 6 to about 200 mesh (U.S. Standard Sieve) is generally used.

In other applications such as shell and core mold manufacture in the foundry industry, the siliceous materials common to that industry may be employed.

Resin

The resins suitable for use in forming the coating include true thermosetting phenolic resins of the resole type and phenolic novolac resins which may be rendered heat reactive through the addition of catalysts. The resins must form a solid nontacky coating at ambient temperatures. This is required so that the coated particles remain free flowing and so that they do not agglomerate under normal storage conditions. Resins with softening points of 185°–240° F. (Ball and Ring Method) are acceptable.

Regardless of which type of resin is employed a coupling agent as subsequently described is preferably incorporated into the resin during its manufacture. The coupling agent, which has a functional group reactive in the phenol-formaldehyde system of the resin is added in an amount ranging from about 0.1 to 10 percent by weight of the resin. The preferred range is from about 0.1 to 3.0 percent by weight of the resin. The coupling agent is incorporated into the resin under the normal reaction conditions used for the formation of phenol-formaldehyde resins. The coupling agent is added to the resin reactants prior to the beginning of the phenol-formaldehyde reaction. This incorporation of the coupling agent in the resin is partly responsible for the increased resin-center bond strength provided by the invention.

The preferred resin to be used with the method of the present invention is a phenolic novolac resin. When such a resin is used it is necessary to add to the mixture a cross-linking agent to effect the subsequent curing of the resin. Hexamethylenetetramine is the preferred material for this function as it serves as both a catalyst and a source of formaldehyde.

It is also advantageous to add an organic acid salt such as calcium stearate to the resin-center mixture to act as a lubricant. Such an addition imparts a degree of water repellancy to the finished product and aids in preventing sintering of the product during storage. The organic acid salt may be added to the resin or more conveniently may be simply added as a powder at the time the resin is added to the heated centers.

Problems associated with sintering of the product during storage can be further minimized by increasing the "stickpoint" of the resin. Raising of the stickpoint avoids problems of sintering and lumping of the resin coated particle when stored at high temperatures (100°–120° F.).

Stickpoint is measured by applying the resin coated particles to a square metal rod heated at one end. The rod has a uniform temperature gradation from its heated end to its unheated end. After one minute the particles are dusted from the rod. The temperature of the point along the rod at which the particles adhere to the rod is measured and is the stickpoint.

To increase the stickpoint a small amount of dry hexamethylenetetramine is added to the flake novolac resin before it is discharged to the muller. The blending of the hexamethylenetetramine with the resin during the initial phase of the hot coating process allows for some polymerization of the resin to occur before cooling. This polymerization results in an increase in the resin stickpoint.

The amount of hexamethylenetetramine added in this manner is dependent upon the final stickpoint desired. Generally about 1 to about 10% dry hexamethylenetetramine based on the weight of the flake resin is added. For example, the addition of 2.8% hexamethylenetetramine to the resin in the manner just described elevated the stickpoint of the finished product from 210° F. to 238° F. This increase in stickpoint is sufficient to remedy the storage problems of sintering and lumping.

Another problem encountered in the use of the product of the instant invention is the creation of dust during handling operations in the field. The resin coating on the particles is brittle, and abrasive action between the particles during high velocity transport generates fine particles of free resin. This dust is objectionable to observe and its elimination is desirable.

The incorporation of a small amount of polyvinyl acetal resin into the resin coating has been found to increase the resin strength and thereby reduce its brittleness. This results in the virtual elimination of the dusting problem.

The preferred polyvinyl acetal for this application is polyvinyl butyral although other resins such as polyvinyl formals may be used.

Specifically a polyvinyl butyral, BUTVAR B-76, manufactured by Monsanto Co. has proven to be effective in strengthening the resin coating and eliminating the dust problem.

Coupling Agent

The coupling agent to be employed is chosen based on the resin to be used. For phenolic resins, the preferred coupling agents are organo-functional silanes such as aminoalkylsilanes. Gamma-aminopropyltriethoxysilane has given excellent results when used with phenolic resins. Preferably the coupling agent is both incorporated into the resin structure and reacted with the center surface prior to the resin coating step. This unique dual treatment with the coupling agent results in a higher resin-center bond strength and a concomitant increase in the strength of the cured mass. The same coupling agent may be used in both the resin and the center treatment, or two different coupling agents may be employed. It is also possible to obtain some improvement in the strength of the cured mass by only pretreating the center surfaces.

Coating Process Parameters

The centers to be coated are weighed and then transferred to a heated rotating drum. During the transfer, the centers are sprayed with a solution containing the coupling agent. A solution is used to insure adequate wetting of the center surface with the coupling agent. The preferred solvent is water.

A sufficient quantity of water must be used to insure adequate dispersion of the coupling agent over the surface of the centers. It is also important not to use too much water as excessive time and heat are then needed to drive off the water during the evaporation step. The amount needed is of course dependent upon the size of the centers. For example, for 20/40 mesh sand, it has been found that 0.1 to 3 gallon per 1000 lb. of sand gives adequate coverage.

The concentration of coupling agent in the water depends on the surface area of the centers, the amount of water to be used and the nature of the coupling agent. The concentration is generally between 0.1% and 10.0% by volume. The preferred range is generally between 0.5% and 3.0%.

After the coupling agent sprayed centers have entered the heater drum, the mixture is agitated without heat for a period of time ranging from 5 seconds to 1 minute to insure proper dispersion of the coupling agent over the surface of the centers.

The heater is then fired and the centers are heated by a hot air blast to approximately 250°-350° F. During this heating period the water is evaporated and the coupling agent reacts with the surface of the centers. In addition, the hot air blast can be utilized to remove fines from the centers which can lower the permeability of the cured particle mass.

The heated centers are then discharged into a mixer. The flake resin into which a coupling agent has been incorporated is then added. The ratio of resin to the centers varies with the strength required and the size of the centers. Typically the resin coating constitutes between about 1 and about 8 percent by weight of the particles. Dry hexamethylenetetramine may also be added at this time to elevate the stickpoint as previously described.

A lubricant such as calcium stearate is added to the centers with the resin. The amount of lubricant is generally in the range of 0.1 to 10 percent based on the weight of the resin. The preferred amount is in the range of about 0.5 to 5.0 percent. Also a polyvinyl acetal may be added at this time to improve the resin strength and eliminate the creation of dust during handling.

The mixture of heated centers and resin is then agitated for a period of about 30 seconds to 5 minutes. There must be sufficient agitation time to insure complete coverage of the centers.

An aqueous solution of hexamthylenetetramine is then added to the resin-center mixture. This solution serves as a vehicle for the addition of the hexamethylenetetramine and as a quench. The amount of hexamethylenetetramine is generally between about 10 and 20 percent based on the weight of the resin. The preferred range is between about 13 and about 17 percent. The amount of water should be sufficient to cool the mixture sufficiently to prevent reaction of the hexamethylenetetramine and to harden the resin. The amount of water needed ranges generally from about 1 to 5 gallons per 1000 lbs. of particles. In such a case the quench is still necessary to prevent further reaction of the resin and to begin the hardening process.

After the quench solution is added, the agitation of the mixture is continued and the coated particles are further cooled by blowing air through them.

The hardened particles are then discharged to conveyors which carry the coated particles to screening and bagging operations.

Typical Coating Cycle

One thousand pounds of 20/40 frac sand is weighed in a weigh hopper. As the sand is discharged from the weigh hopper to a heater drum it is sprayed with six quarts of a water solution containing 0.89 percent by volume of silane A-1100 (an aminoalkylsilane purchased from Union Carbide Corporation). The sprayed sand is then rotated in the heater drum for 15 seconds prior to ignition of the heater in order to insure a thorough wetting of the sand by the silane water solution.

The heater fire is ignited and the sand is heated to approximately 270° F. by the hot air blast in approximately three minutes. During this period the water is evaporated and the coupling agent reacts with the sand surface. In addition, the force of the hot air blast carries away any fines form the sand.

The heated sand is then discharged into a muller where 35 pounds of the novolac resin which contains 0.5% gamma-aminopropyl-triethoxysilane along with one-half pound of calcium stearate powder is added. This mixture is mulled for 60 seconds during which time the resin melts and forms an even coating on the particles of sand. At the conclusion of the mull cycle an aqueous solution of hexamethylenetetramine is added to the mixture as a quench. The amount of hexamethylenetetramine is equal to 15% of the resin by weight. The quench water cools the resin coating to harden it and also prevents reaction of the novolac with the hexamethylenetetramine. After addition of the quench water solution, agitation is continued for approximately another minute as cool air is blown through the mixture to further cool the coated particles.

The coated sand is then discharged to a screw conveyor where it is then transported to screening equipment and shakers and ultimately bagged. The product thus produced is free flowing and may be handled with ordinary particle handling machinery typical to the oil, gas and foundry industries.

Comparative Strength Data

Table 1 shows comparative tensile strengths for cured specimens of coated sand. In each case sand (American Foundry Society #95) was coated with 3% (based on the weight of the sand) of a novolac resin. The coated sand was then cured and the hot and cold tensile strengths measured. Sample A was prepared with a standard commercial novolac (Reichold 24-713) commonly used for coating foundry sand. Sample B was prepared according to the preferred method of the invention.

TABLE 1

|  | Sample A (no coupling agent; Reichold 24-713 resin) | Sample B (coupling agent in resin and on substrate) |
|---|---|---|
| Hot Tensile Strength (450° F.) | 283 psi (Average of 3 tests) | 390 psi (Average of 6 tests) |
| Cold Tensile Strength (75° F.) | 628 psi (Average of 6 tests) | 978 psi (Average of 12 tests) |

MICROSCOPIC OBSERVATIONS OF COATED PARTICLES

Particles produced by the method of the present invention were subjected to microscopic examination in both the cured (in brine) and uncured state. Examination of uncured particles prepared without a coupling agent in either the resin or on the substrate reveals an uneven, non-uniform coating. Examination of the same particles after curing in brine show that the resin coating has pulled away from the center. Such "peel back" of the resin from the center leads to failure of the cured mass when used downhole in the oil and gas industry.

Another group of particles was coated using a coupling agent in the resin, but with no pretreatment of the centers with coupling agent. Microscopic examination of these particles shows that the coating is more uniform than the coated particle without any coupling agent. However, the coating is still uneven and the uneveness is more pronounced after curing in brine. This uneveness results in lower strength in the cured mass.

A third group of particles was coated by the preferred method of the present invention. The coupling agent was incorporated in the resin and used to pretreat the centers. Examination of the uncured particles shows a uniform, even coating. This is a desirable property as it allows closer and more uniform packing of the particles with resulting higher strength. Examination of the cured particles reveal that they maintain the smooth uniform coatings after curing in brine, completely and evenly encapsulating the center.

The strength of cured multi-layer packs made from the three preparations of resin coated particles just discussed was measured. In the first, prepared without any coupling agent, very little consolidation was obtained in a multi-layer pack. In the second, prepared with coupling agent in the resin only, a consolidated core having low to medium strength was obtained. Finally, using coated particles prepared by the method of the invention, consolidated cores of high strength were produced.

Formation Treatment

The free-flowing, heat curable particles as produced by the above method may be used as proppants or fluid loss agents in hydraulic fracturing, as aggregate in gravel packs, and in other subterranean formation treatments requiring particulate material.

In carrying out a hydraulic fracturing operation, a fracture is first generated by injecting a viscous fluid into the formation at a sufficient rate and pressure to cause the formation to fail in tension. Injection of the fluid is continued until a fracture of the desired geometry is obtained. A carrier fluid having the proppant suspended therein is then pumped into the fracture. The temperature of the carrier fluid during pumping operations will be low so as to prevent premature curing of the resin. The carrier fluid bleeds off into formation and deposits the propping agent in the fracture. This process is controlled by fluid loss agents which are small aggrregate particles that temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. At the same time, ambient formation temperature heats the resin. Initially, the resin fuses and unites at contact areas between contiguous particles or with the formation walls. As the temperature increases the polymerization reaction proceeds until the resin is cured into an insoluble and infusable cross-linked state. The pendular regions between adjacent particles bond the packed particles into a permeable network having considerable compressive strength.

In carrying out linerless gravel pack completions the particles, suspended in a carrier fluid, are injected into the well and forced through the well casing perforations. During the particle placement, the carrier fluid bleeds off into the formation and deposits the free-flowing heat curable particles in the cavity previously formed. Following placement of the particles, the well is shut in permitting the temperature to equalize in the well. Increase in the temperature in the packed interval softens or melts the resin coating and then cures the resin into an infusible cross-linked state. The permeable network resulting from this treatment provides a self-sustaining, consolidated interval which prevents the aggregate from flowing through the perforations and entering the well bore.

A more detailed description of the standard industry practices for the use of such heat curable particles in hydraulic fracturing and gravel pack completion is disclosed in U.S. Pat. No. 3,929,191 which is hereby incorporated by reference.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. It is intended that all such modifications, alterations, and variations which fall within the spirit and scope of the appended claims be embraced thereby.

What is claimed is:

1. A free-flowing high strength particle, useful in the production of shell molds and cores in the foundary industry and in the treatment of subterranean formations, comprised of high strength centers and a heat curable resin coating and manufactured through process steps comprising:
   incorporating a coupling agent into said heat curable resin;
   coating said centers with a coupling agent;
   reacting said coupling agent with said centers;
   heating said centers to a temperature above the melting point of said resin;
   adding said resin to said centers;
   mixing said resin and said centers until said resin is dispersed over the surface of said centers; and
   quenching said mixture with water.

2. The particle of claim 1 wherein said coupling agent is an organo-functional silane.

3. The particle of claim 2 wherein said coupling agent is applied to said centers as an aqueous solution containing 0.1–10.0 percent coupling agent by volume.

4. The particle of claim 1 wherein said coupling agent is present in said resin in the amount of 0.1–10.0 percent by weight.

5. The particle of claim 1 wherein calcium stearate in the amount of 0.1–10.0 percent based on the weight of the resin is added to said resin and said centers.

6. The particles of claim 1 wherein a polyvinyl acetal is added to said resin and said centers.

7. The particle of claim 6 wherein said polyvinyl acetal is polyvinyl butyral.

8. The particle of claim 1 wherein said resin is a resole.

9. The particle of claim 1 wherein said resin is a novolac.

10. The particle of claim 9 wherein hexamethylenetetramine is added with said quench water to the mixture of said centers and said resin.

11. The particle of claim 10 wherein dry hexamethylenetetramine is added to said resin prior to mixing with said centers in the amount of about 1 to about 10% based on the resin weight.

12. The particle of claim 1 wherein said centers are silica sand having a mesh size between about 6 and about 200.

13. The particle of claim 1 wherein said centers are glass beads having a mesh size between about 6 to about 200.

14. The particle of claim 1 wherein said centers are sintered bauxite, aluminum oxide, ceramics or other mineral particles.

15. A sand coated with a heat curable novolac resin, manufactured through process steps comprising:
   incorporating an aminoalkylsilane in said resin during its manufacture;
   spraying said sand with an aqueous solution of an aminoalkylsilane;
   heating said sand to a temperature above the melting point of said resin;
   adding said resin to said sand;
   mixing said resin and said sand until said resin is dispersed over the surface of said sand; and
   quenching the mixture of said resin and said sand with a solution of water and hexamethylenetetramine.

16. The resin coated sand of claim 15 wherein dry hexamethylenetetramine is added to said sand and said resin prior to mixing in the amount of about 1 to about 10% based on the resin weight.

17. The resin coated sand of claim 16 wherein a polyvinyl acetal is added to said sand and said resin prior to mixing in the amount of about 1 to about 20% based on the resin weight.

18. The resin coated sand of claim 17 wherein said polyvinyl acetal is a polyvinylbutyral.

* * * * *